United States Patent [19]

Mattis, Jr. et al.

[11] Patent Number: 4,475,211

[45] Date of Patent: Oct. 2, 1984

[54] DIGITALLY CONTROLLED TRANSVERSAL EQUALIZER

[75] Inventors: William E. Mattis, Jr., Wilmington, Del.; Chester J. Wolejsza, Jr., Gaithersburg; Vasil Uzunoglu, Ellicott City, both of Md.

[73] Assignee: Communications Satellite Corporation, Washington, D.C.

[21] Appl. No.: 417,753

[22] Filed: Sep. 13, 1982

[51] Int. Cl.³ .............................................. H03H 7/36
[52] U.S. Cl. ....................................... 375/15; 333/18; 364/724
[58] Field of Search ............... 375/12, 14, 15; 333/18, 333/28 R, 166; 364/724, 825, 572, 581, 582; 328/163, 164

[56] References Cited

U.S. PATENT DOCUMENTS 3,755,738  8/1973  Gitlin et al. ........................... 375/15
4,330,861  5/1982  Impallomeni et al. ................ 375/15
4,334,313  6/1982  Gitlin et al. .......................... 375/15 X Primary Examiner—Robert L. Griffin
Assistant Examiner—Albert W. Watkins
Attorney, Agent, or Firm—Sughrue, Mion, Zinn Macpeak & Seas

[57] ABSTRACT

An adaptive equalizer performs equalization at IF, demodulates the input signal and then generates the equalization coefficients at baseband from the demodulated data. Coefficient updating can be done on a non-real time basis and coefficients for individual bursts stored in a coefficient memory for retrieval when the same burst occurs in the next frame, thus obtaining a pseudo-continuous equalization for each burst. The error signal is derived from demodulated equalized data and correlated with demodulated unequalized data to generate the correlation coefficients, and individual error signals from each channel can be combined into a single composite error signal for correlation purposes.

10 Claims, 6 Drawing Figures

DIGITALLY CONTROLLED TRANSVERSAL EQUALIZER

BACKGROUND OF THE INVENTION

This application is related to copending and commonly assigned application Ser. No. 417286, entitled "Digitally Controlled Transversal Equalizer", filed Sept. 13, 1982.

This invention is directed to a transversal equalizer and, more particularly, to adaptive equalizers. The invention is specifically directed to an implementation of an adaptive transversal equalizer wherein the transversal equalizer is implemented at IF and its adaptive algorithm is controlled by a digitally based controller in accordance with information derived from the baseband signal.

Conventional adaptive equalizers have utilized a baseband implementation of the transversal equalizer, e.g. a tapped delay line, in addition to baseband processing of the adaptive algorithm. FIG. 1 is a schematic diagram of a 5-tap implementation of a conventional adaptive transversal equalizer, with FIG. 2 illustrating the same equalizer in block diagram form. As shown in FIG. 1, the conventional adaptive transversal equalizer for use in high speed PSK or QPSK applications, receives a demodulated I channel signal at terminal 10 and a demodulated Q channel signal at terminal 20. Each data channel is then delayed in symbol time increments, e.g. the I channel is delayed in a tapped delay line comprising a plurality of delays 12, 14, 16 and 18, and the various delayed signals are then weighted in multipliers 11, 13, 15, 17 and 19 with respective coefficients A1-A5. The weighted signals are then combined in a summer 30. In addition to inputs weighted in accordance with the direct coupled coefficients A-A5, the summer 40 rceives additional inputs from multipliers 50, 52, 54, 56 and 58 which provide weighted samples from the Q channel, these samples being weighted in accordance with cross-coupled coefficients C1-C5. The summer 40 provides an output error signal e to the predictor 60 where the error signals are quantized in a level discriminator 62 which is shown more clearly in FIG. 1A, the series of quantized output signals from the level discriminator 62 are integrated in a low pass filter (LPF) 64, and the integrated error signal is then provided as one input to summing amplifier 66 which adds the integrated error signals to the present error signal to provide a predicted value output at node 68. The predicted value is supplied, with appropriate gain control, as one input to each of mixers 70, 72, 74, 76 and 78 where it is mixed with a respective delayed I channel signal. The mixer output signals are sampled in samplers 80, 82, 84, 86 and 88 and filtered in filters 90, 92, 94, 96 and 98, with the filter outputs providing the appropriate direct coupled coefficients A1-A5 to the multipliers 30-38. The predicted signal value at node 68 is also provided with appropriate gain control to a plurality of mixers for combination with various delayed values of the demodulated Q channel signal, with subsequent sampling, filtering and feeding back of the cross coupled coefficients C1-C5 to the appropriate multipliers 50-58 in a similar manner.

A second summer 41 receives weighted inputs from both the I and Q channels in a similar and provides an error signal output to a second predictor 61 which operates in the same manner as the predictor 60. For a Quadrature Phase Shift Keying (QPSK) modem. The weighted outputs of one channel, including the center weight, are summed with the corresponding weighted outputs of the other channel, excluding the center weight. The output of each summation network is applied to a predictor and comparator, and the two outputs of each predictor and comparator which constitute the errors are applied to the control algorithm of both channels. The control algorithm cross-correlates the output of the transversal equalizer and produces the control signal to change the weights of the transversal equalizer taps.

A problem with such an arrangement is that the functional complexity of the conventional baseband adaptive equalizer illustrated in FIG. 1 renders it difficult to implement and very costly. For example, the multipliers, e.g. multipliers 30-38 and 50-58, used to form the final signal must operate over a frequency range from DC to the maximum frequency of the input signal with good phase characteristics. These multipliers must also operate in all four quadrants, and be reasonably linear for good reduction of intersymbol interference. The error correlators, e.g. 70-78, must satisfy the same requirements, except that linearity requirements are relaxed, since the non-linearity will only affect the convergence time. For high speed QPSK modems operating in the TDMA mode, the conventional baseband equalizer cannot respond fast enough to the variations of successive bursts. These limitations are due to the functional and operational requirements as well as the frequency limitations of components. For example, analog summation amplifiers and four-quadrant amplifiers for high speed operations (>120 Mbit) are not readily available. Although the analog summation or differential amplifiers may be custom built, the four-quadrant multipliers are even difficult to custom build for operations at 120 Mbit/s. Also, for a 120 Mbit QPSK modem, summation networks are not readily available, especially those requiring more than three input summations. Phase linearity on all amplifiers is also important.

A further problem with the conventional equalizer design is that integration of the error signal in the predictor 60 is carried out continuously and the coefficients converge to obtain a minimum mean square error averaged over the entire signal. This technique is very costly at high speeds. Further, since continuous integration of the error function is used, the design is unsuitable for discontinuous burst communications encountered in TDMA applications.

SUMMARY OF THE INVENTION

It is therefore an object of this invention to provide an adaptive transversal equalizer less complex and less costly than a conventional equalizer.

It is a further object of this invention to provide such a transversal equalizer which is not only functionally simpler than a conventional equalizer but also utilizes less costly components.

It is a further object of this invention to provide a transversal equalizer suitable for use in TDMA burst communications and for use at high speeds.

Briefly, these and other objects are achieved by the provision of an adaptive transversal equalizer wherein the equalizer is implemented at IF and the tap weights or coefficients of the equalizer are digitally controlled in accordance with information derived from the baseband signal. More specifically, the novel hybrid adaptive equalizer according to the present invention derives errors from a baseband equalizer to control the coefficients to the IF equalizer. The errors extracted from the baseband equalizer can thus be delayed and distributed according to the TDMA burst time sequence allowing separate processing of each burst. In the preferred embodiment, the signal is equalized and then demodulated to obtain equalized data, and first and second error signals are generated in accordance with equalized data in each of first and second channels. The error signals are combined to obtain a composite error signal which is then correlated with unequalized data obtained by demodulating the unequalized input signal. The coefficient values are then adjusted in accordance with the correlation results.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENTS

Figure 1:
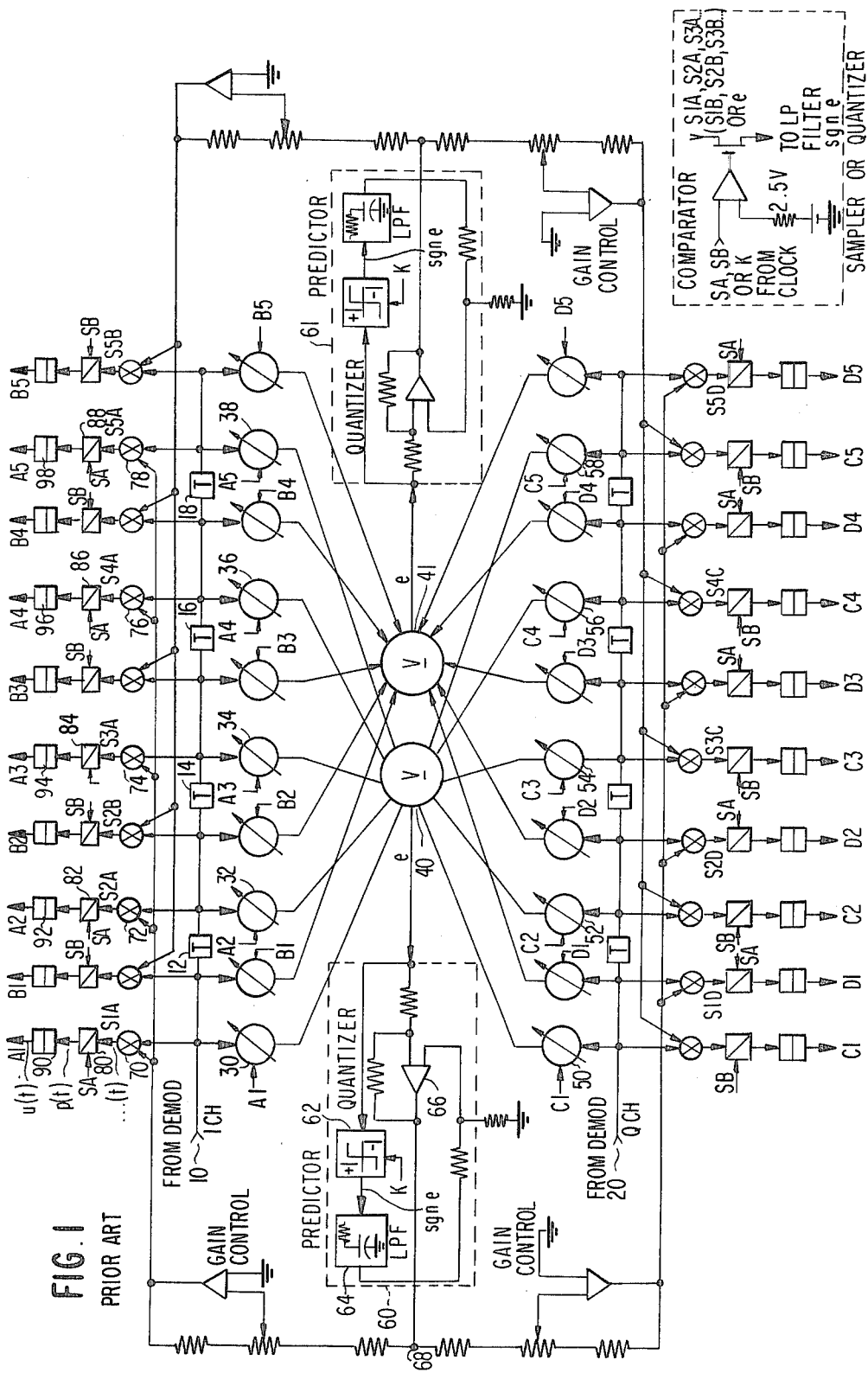
FIG. 1 is a schematic diagram of a conventional baseband transversal equalizer.
Figure 2:
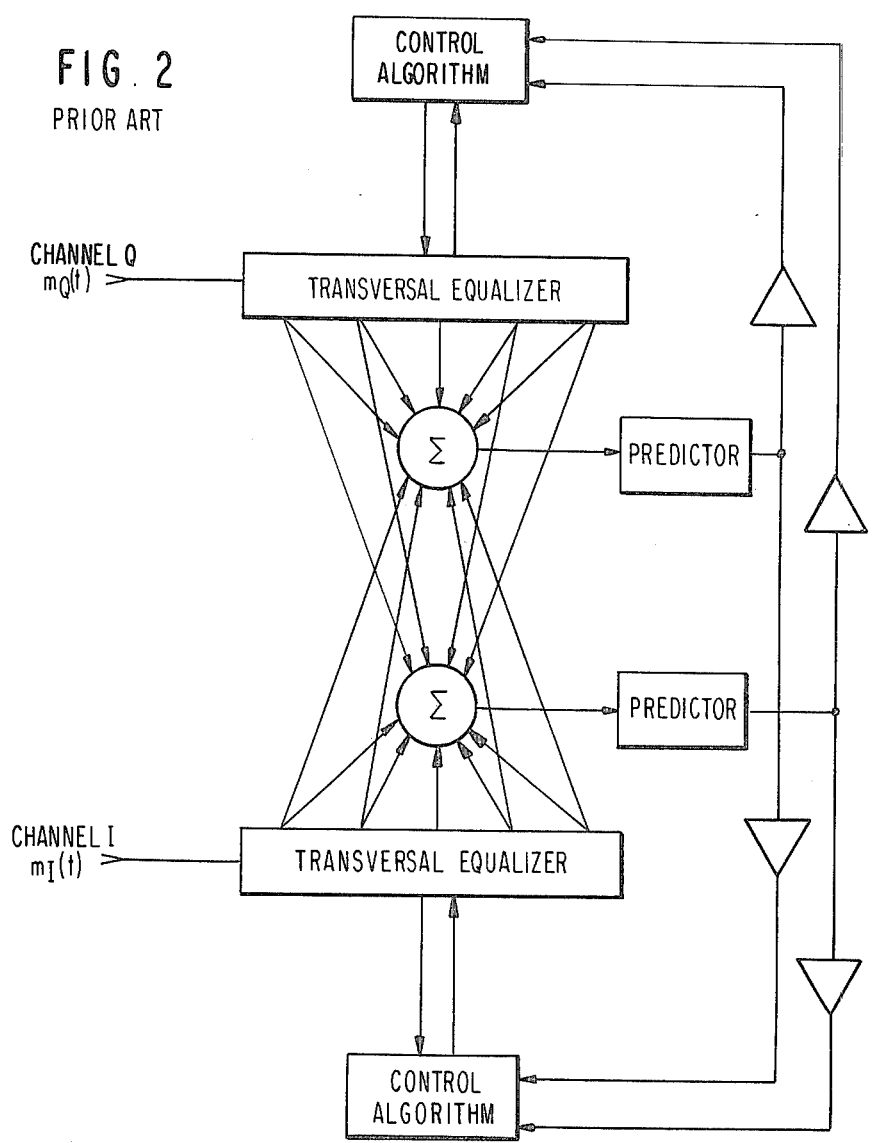
FIG. 2 is a block diagram of the equalizer illustrated in FIG. 1.
Figure 3:
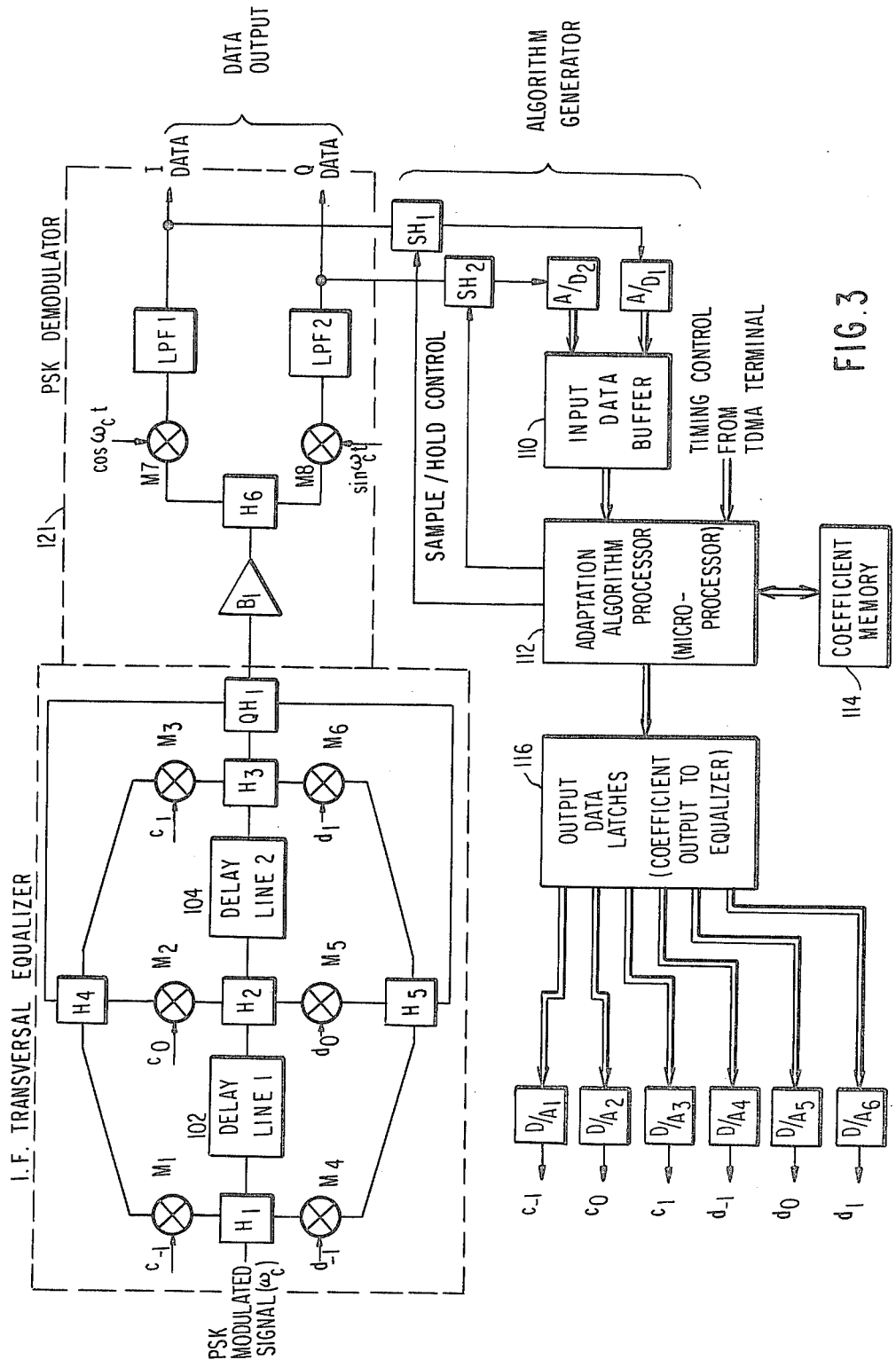
FIG. 3 is a diagram of a digitally controlled adaptive equalizer according to a first embodiment of the present invention.

FIG. 3 illustrates a first embodiment of the equalizer according to the present invention wherein the adaptive equalizer portion of the device is implemented at IF. The equalizer illustrated in FIG. 3 is a three-tap equalizer, although additional taps could be added in a manner well understood in the art. The adaptive equalizer includes hybrids $H_1$, $H_2$ and $H_3$ as well as delay lines 102 and 104. Mixers $M_1$-$M_6$ multiply appropriate tap outputs by respective coefficients, including "real" coefficients $C_{-1}$, $C_0$ and $C_1$, and "imaginary" coefficients $d_{-1}$, $d_0$ and $d_1$, i.e. I and Q channels. Hybrids $H_4$, $H_5$ and the quadrative hybrid $QH_1$ together form a combiner that produces the output signal. Thus, the transversal equalizer receives the QPSK modulated input signal and performs equalization of the signal prior to demodulation. The equivalent baseband "impulse" response of this IF transversal equalizer is then given by $$h(t) = k_{-1}\delta(t-T) + k_0\delta(t) + k_1\delta(t+T)$$

where $k_i = C_i + j d_i$, $T$ = delay length and $\delta(t)$ is the dirac delta function.

As is clear from the above equation, the equivalent Fourier transform is given by:

$$H(W) = k_{-1} e^{-j\omega T} + k_0 + k_1 e^{+j\omega T}$$

This function gives essentially independent amplitude and phase terms which are nearly sinusoidal. The configuration of the present invention illustrated in FIG. 3 allows considerable flexibility in equalizing parabolic and linear distortion in amplitude and phase. More taps would allow equalization of more complex distortions.

The output of the quadrative hybrid $QH_1$ comprising an equalized QPSK modulated signal can then be demodulated in a well known manner via amplifier $B_1$, hybrid $H_6$, mixers $M_7$ and $M_8$ and low pass filters LPF1 and LPF2 to obtain the I-channel and Q-channel output data. The data for each of these channels is then sampled in respective sample and hold circuits $SH_1$ and $SH_2$ in accordance with sampling pulses received from an adaptation algorithm processor which may conveniently be a commerically available microprocessor. The outputs from sample and hold circuits $SH_1$ and $SH_2$ are then converted to digital form in analog-to-digital converters $A/D_1$ and $A/D_2$, respectively, and the digital sample data for each channel is then stored in an input data buffer 110.

The first step in generating the algorithm for controlling the equalizer is to provide initial coefficients and to use these coefficients to initialize the transversal IF equalizer. Thus, the microprocessor 112 can initially read from a coefficient memory 114 a plurality of initialization coefficients which have been externally loaded. These coefficients can be provided to a corresponding plurality of output data latches collectively designated by reference 116 in FIG. 3. The initialization coefficients are converted in respective converters $D/A_1$-$D/A_6$ into analog coefficients which can be provided to the corresponding mixers $M_1$-$M_6$ in the IF transversal equalizer.

In an operating TDMA system, each station transmits a synchronized burst of QPSK modulated data, such that data from the various stations does not overlap at the satellite. During the early portion of a burst from a particular station, after transients have settled, the microprocessor 112 can enable the sample and hold circuits $SH_1$ and $SH_2$ as well as the converters $A/D_1$ and $A/D_2$ to obtain samples of the equalized data waveforms. The number of samples per burst may range from 10 to several 100, depending upon the speed of the processing which is available. Given the known old, i.e. initial, coefficients together with the newly obtained samples, new coefficients can be computed using any one of a variety of known algorithms (e.g. zero forcing, minimum mean square error, etc.) and the newly calculated coefficients can then be stored in the memory 114 in place of the original coefficients. At the beginning of the next burst from that station, the updated coefficients will be provided to the IF transversal equalizer.

The computation of new equalizer coefficients need not take place in real time, i.e. before the start of the next burst. Instead, the computation could be done off-line and the memory 114 updated only once every several seconds. The only operations which must be performed in real-time are the loading of the output latches at the start of each burst and the sampling of the demodulated data in the receiver. In a slowly varying TDMA system, this technique allows independent adaptation to occur for each burst in the TDMA frame.

The digitally controlled equalizer shown in FIG. 3 represents a distinct improvement over the prior art, but nevertheless suffers from a number of disadvantages. More particularly, in order to obtain the information necessary for the processing algorithm, the baseband waveform must be sampled, held and converted from analog to digital form at the symbol rate. For a 120 Mbit INTELSAT system, this processing must occur at 60

MHz, which is quite fast and is especially troublesome for the A/D conversion. One convergence algorithm, that of minimum mean square error by steepest descent, offers the possibility of an alternate equalizer and control implementation which does not require such fast A/D conversion and, therefore, provides a simpler embodiment of the basic concept. A block diagram of this improved equalizer configuration according to a second embodiment of this invention is shown in FIG. 4.

Figure 4:
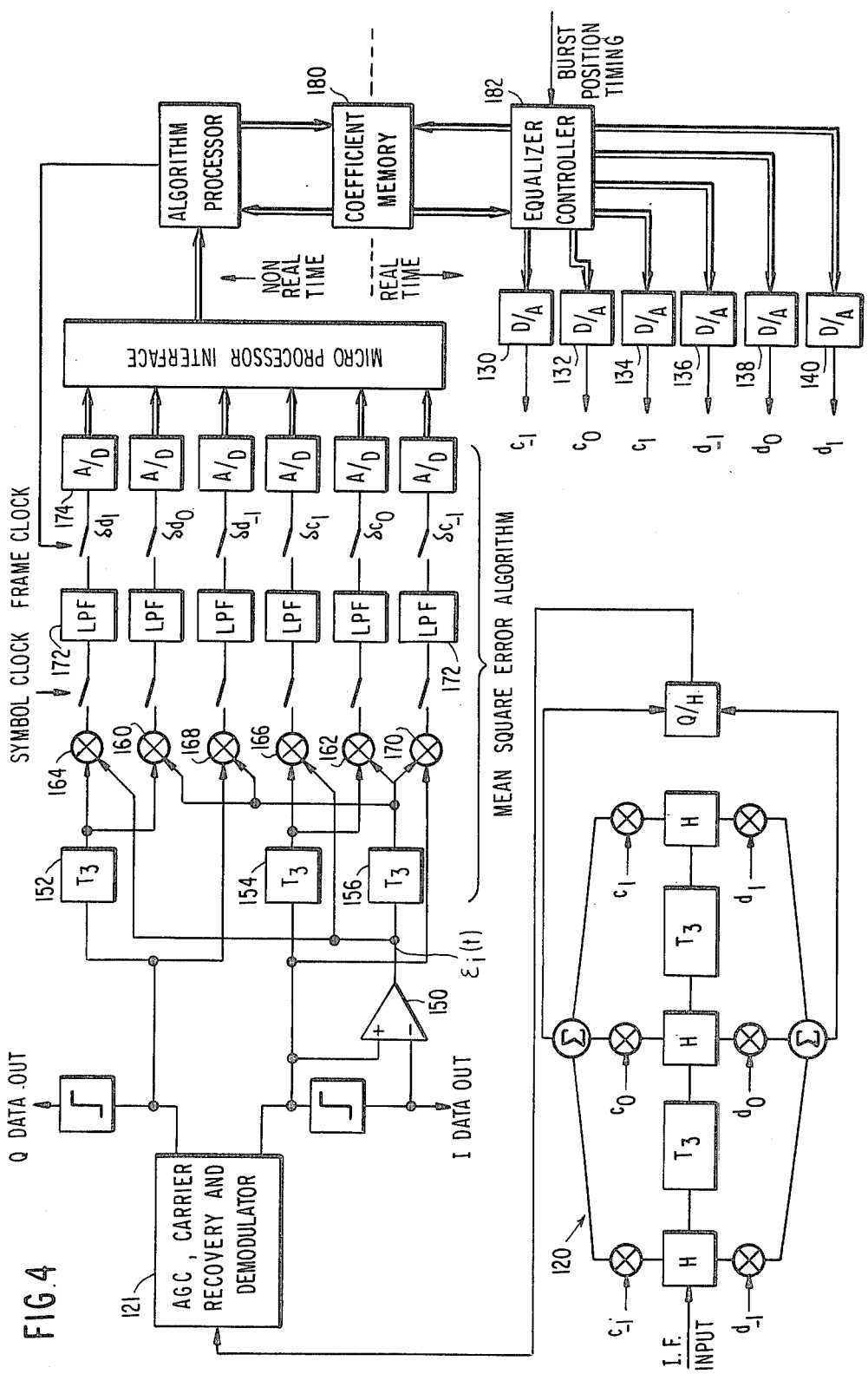
FIG. 4 is a diagram of a digitally controlled adaptive transversal equalizer according to a second embodiment of this invention.

The embodiment of FIG. 4 is similar to that of FIG. 3 in that the IF transversal equalizer network 120 for performing the actual equalization and the gain control, carrier recovery and demodulator network 122, may be identical to their counterparts in FIG. 3. An essential distinction between the two embodiments, however, is that the coefficients in the embodiment of FIG. 4 are fed to the equalizer at the proper time by a hardware controller via D/A converters 130-140. This enables a much faster operating speed than can be obtained by the first embodiment of FIG. 3.

To describe the error signal generation and coefficient updating of the embodiment of FIG. 4 in more detail, the algorithm consists of three steps: (1) the generation of the error signal in hardware, rather than software, representing the difference between the actual and desired data signals, (2) hardware correlation and integration of this error signal with the data signal, and (3) updating of the equalizer coefficients by processing the integrated error signal in software.

The first operation is straightforward since, in a digital demodulation system such as QPSK, the received waveform is known to have only two nominal values in each of the two channels, $+V$ and $-V$ where V is some voltage determined by the hardware design. The actual decision is made by determining the polarity of the signal, and hence the basic information on what the signal should be is known to a high degree of confidence. Having decided the polarity, the error is obtained by hard limiting the baseband signal and subtracting the nominal voltage values from the actual voltage values to obtain an error waveform $\epsilon(t)$. As will be discussed in more detail below, only one channel need be considered for error generation, and the error signal is provided at the output of the comparator 150.

The second operation is derived directly from the minimum mean square error (MMSE) algorithm. It can be shown that the partial derivative of the MSE with respect to any particular coefficient is related to the correlation between the error signal and that data signal whose time shift and relationship to the error is the same as the coefficient itself. For example, to obtain a measure of the error in the reference coefficient $C_0$, it is necessary to obtain the correlation between the error signal and the data at the same time and same channel as the error. Similarly, to obtain the error measure of the $d_{-1}$ coefficient which operates on a data pulse while the reference pulse is at the mixers $M_2$ and $M_5$, it is necessary to correlate the error signal with the data pulse in the opposite channel which comes after the error sample. This is accomplished by delaying the error signal and then correlating with the undelayed data.

Referring more particularly to FIG. 4, each of delay elements 152, 154 and 156 provides the same delay time. Mixers 160 and 162 correlate the delayed error signal with data from respective channels delayed by an equal amount, thus providing the required correlation for the reference coefficients. Mixers 164 and 166 receive the undelayed error signal together with delayed data from respective channels to thereby provide the required correlation for the coefficients $d_{-1}$ and $C_{-1}$, respectively. Finally, mixers 168 and 170 receive delayed error signals together with undelayed data to thereby provide the required correlation for the coefficients $d_1$ and $C_1$, respectively. For each of the six coefficients, there is a corresponding correlation between the error signal and the past, present and future symbols in both the I and Q channels. The correlated signals are then sampled at the symbol clock rate and then integrated in respective low pass filters 172 to obtain the average correlation value. Since each burst in a TDMA environment originates from a different earth station, the optimum coefficients may be different for each burst in the TDMA frame, and the correlated error signals are thus sampled for each burst at a frame derived clock. The sampled error signals are then digitized once per frame per burst in A/D converters 174, and thence passed to a microprocessor-based algorithm processor.

The final step of updating the equalizer coefficients can be accomplished on a non-real time basis in the algorithm processor. The error samples are combined with past coefficients retrieved from the coefficient memory 180 according to a steepest descent or equivalent algorithm to obtain new coefficients which are returned to the coefficient memory in a well known manner such as not to interfere with the equalizer controller 182.

The equalizer controller may comprise a simple arrangement such as shown in FIG. 3 including a plurality of output data latches under the control of a processor which provide the proper coefficients to the equalizer in accordance with the incoming burst timing. The coefficient updating process is repeated for each occupied burst in the TDMA frame, and convergence is accomplished by averaging over a number of frames.

It is noteworthy that the use of all six coefficients as variables allows the possibility of also using this processor to provide burst-to-burst gain control, since one effect of changing all coefficients by the same ratio is simply to change the gain of the equalizer. It should also be noted that the algorithm processor automatically provides information on channel distortion, i.e. amplitude and group delay, and can provide performance estimation via a computation of the MSE which in the steady state mode is dominated by thermal noise. Therefore, MSE can be used to estimate the bit error rate (BER). In this way, the possibility of on-line monitoring is provided.

A third embodiment of the present invention will now be described with reference to FIG. 5, which is similar to the previously described embodiments in the esential feature that the equalization is performed at IF. The transversal equalizer is similar in this embodiment in that it includes a pair of delays and six mixers each of which is provided with a respective equalizer coefficient, and the mixer outputs are summed and then again summed in quadrature in a quadrature hybrid 202. The remainder of the system of FIG. 5, however, is markedly different.

The equalized IF signal is provided from the output of quadrature hybrid 202 to a demodulator 204 where the I and Q channel data are recovered in a manner which may be similar to that employed in the demodulator 121 of FIG. 3. The I channel data is then digitized in a threshold decision circuit 206 to obtain the nominal data values which are then subtracted in a subtractor 208 from the actual demodulated data, thereby obtaining an I channel error signal $\epsilon_I$. Similarly, the recovered Q-channel data is hard limited in a threshold decision circuit 210 and subtracted from the actual Q data signal in a subtractor 212 to obtain an error signal $\epsilon_Q$. The I and Q channel data error signals are then combined in summer 214 with the combined error signal being provided through a delay element 216 to be sampled at the symbol clock rate and provided as an input to each of the baseband mixers, or multipliers, 220–230.

The unequalized IF signal is also provided to the demodulator 240 where the unequalized signal is subjected to demodulation in a known manner to recover the I and Q channel data. The I channel data is sampled at the symbol clock rate and provided as an input to the multiplier 220, as an input to the multiplier 222 through the delay element 242, and as an input to the multiplier 224 through the delay elements 242 and 244. The Q channel data is similarly sampled at the symbol clock rate and provided as an input directly to the multiplier 226 and through delay elements 246 and 248 to the multiplier 228 and 230. The outputs from the multipliers 220–230 are provided through respective integrating filters 250, the outputs of which are sampled at the frame clock rate, provided to respective A/D converters 174, and thenceforth processed in the same manner as illustrated in FIG. 4.

Figure 5:
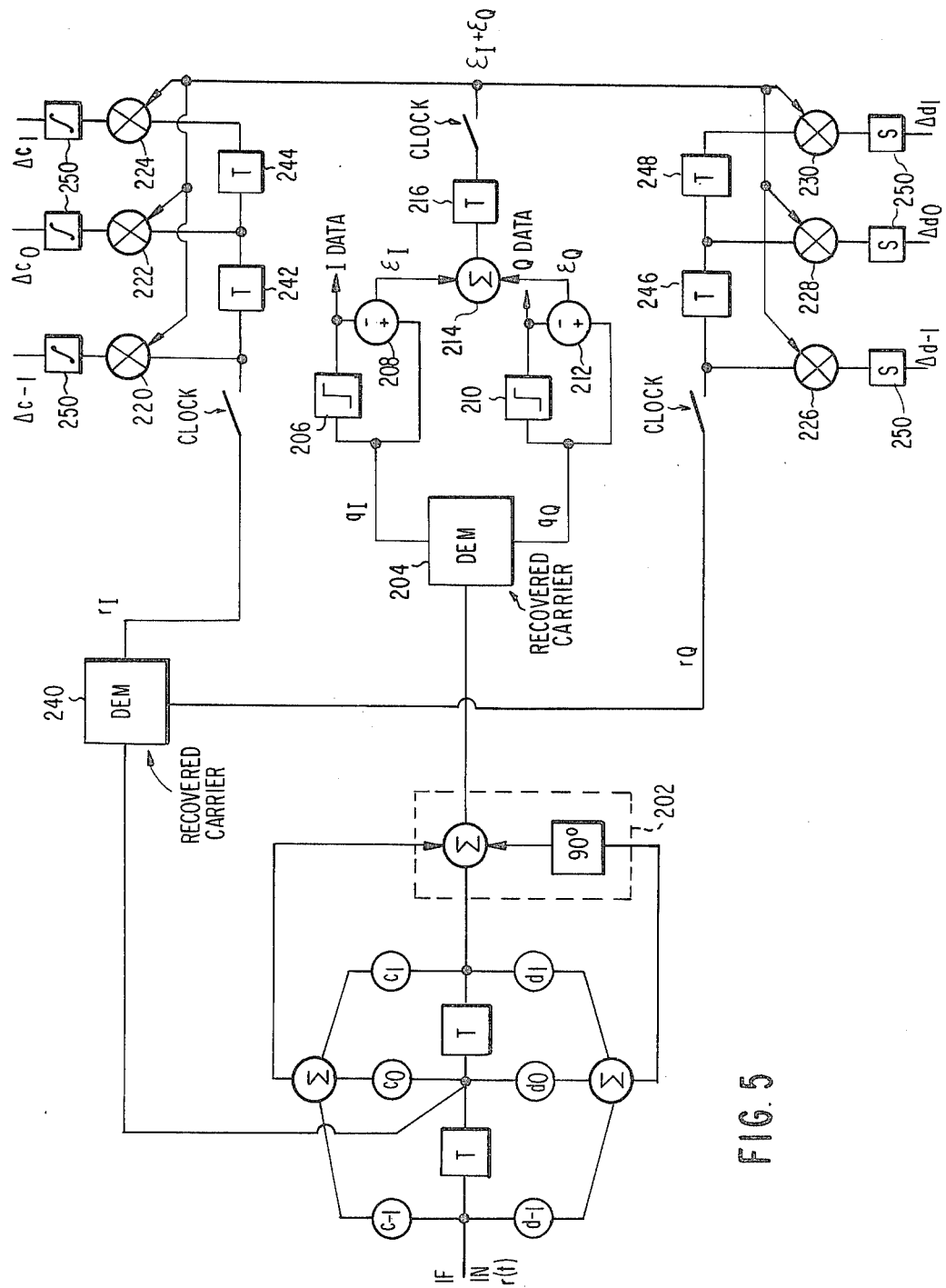
FIG. 5 is a schematic diagram of a transversal equalizer according to a third embodiment of this invention.

A significant distinction between the embodiments of FIGS. 4 and 5 is that, in the embodiment of FIG. 5, the error signal is correlated with data recovered from an equalized input signal, whereas in FIG. 4 the error signal is correlated with data recovered from an equalized signal. This guarantees convergence and permits more effective operation of the MMSE algorithm, since it is otherwise possible for the equalizer to "chase its tail" and ultimately converge to an alternate set of coefficients. An additional significant feature of the embodiment of FIG. 5 is that the two error signals $\epsilon_I$ and $\epsilon_Q$ are combined prior to correlation. This significantly simplifies the necessary hardware by eliminating the complicated cross-correlation characteristic of conventional devices and also characteristic of the embodiments shown in FIGS. 3 and 4. The summation in summer 214 may cause an additional phase term which would represent a phase difference between the IF and baseband signals, but this term would be very small when the combined error signals are themselves minimized, and in any event such phase differences are commonly compensated by phase tracking in a well known manner.

It is important to note that the purpose of the various delays in the system of FIG. 5 is to ensure an equal delay for each data bit from the equalizer to the correlators. For example, the unequalized data at the center tap of the equalizer will have passed through a single delay 242 in order to arrive at the multiplier 222, and the corresponding error signal will also have passed through a single delay 216 before being provided to the same mixer.

Figure 6:
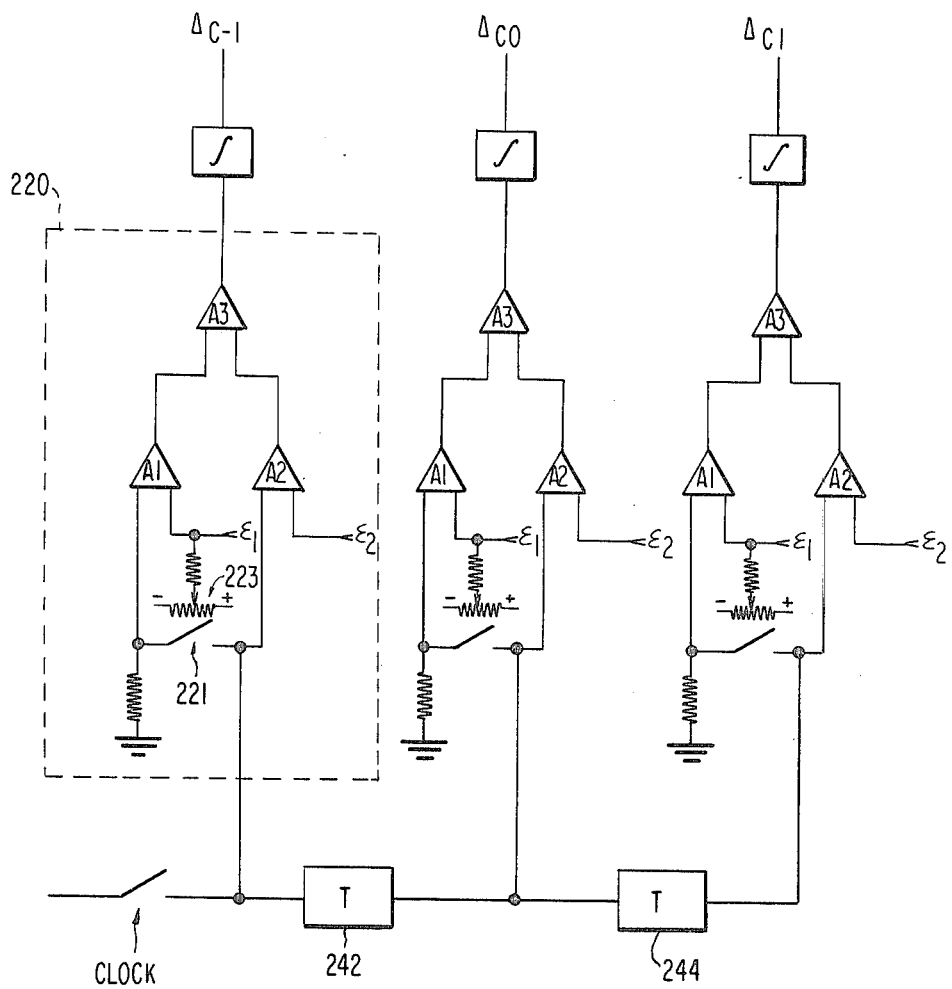
FIG. 6 is a circuit diagram illustrating a novel multiplier configuration used in the invention.

A further important feature in the implementation of the baseband equalizer according to the present invention resides in the specific configuration of the multipliers 220–230. Since it is very difficult to design baseband multipliers capable of very high speed operation, the multipliers in this invention are implemented with three differential amplifiers $A_1$, $A_2$ and $A_3$ as illustrated in FIG. 6. For calibration, an ideal waveform is provided from the demodulator 240 through switch 221 to one input of amplifier $A_1$. The signal is differentially compared with an error signal $\epsilon_1$ which is the error signal generated by the equalizer when the ideal input signal is applied. At this time, amplifier $A_2$ will remain at a zero level. The output of amplifier $A_1$ will then correspond to the output to be obtained for ideal input signals, compensating also for the inadequacies and misadjustments of various components. Once this ideal output level for amplifier $A_1$ has been established, the switch 221 is opened to permit that input of amplifier $A_1$ to be grounded through a resistor, and a potentiometer 23 is connected to generate a reference signal $\epsilon_1$ which is adjusted via potentiometer 23 until the output of amplifier $A_1$ is again at its "ideal" level. The output of amplifier $A_1$ can thenceforth be used as a reference signal.

In subsequent operation, when the output from demodulator 240 is provided to the input of amplifier $A_2$ and differentially compared with an error signal $\epsilon_2$ received from the output of delay unit 216, the difference between the outputs of amplifiers $A_1$ and $A_2$ will correspond to the amount of error but will be referenced to the ideal condition. This difference is produced at the output of amplifier $A_3$, and may be positive or negative depending on the direction in which the error moves. Since the process is iterative and the output of $A_3$ is applied to an integrator 250, the process becomes a correlation replacing a baseband multiplier. The remaining multipliers 222–240 are calibrated and operated in the same manner as described above with reference to multiplier 220. This multiplier configuration could also be used for other multipliers in the system of, e.g., FIG. 4.

As described above, the digitally controlled transversal equalizers according to the present invention solve several problems in component limitations and functional implementation of a baseband equalizer by utilizing errors from the baseband equalizer to control the weights of the RF equalizer, thus forming a complete hybrid adaptive equalization process. This eliminates the need for analog four-quadrant D.C. to high frequency multipliers and permits errors extracted from the baseband equalizer to be delayed and distributed according to the TDMA burst time sequence, thereby allowing separate processing for each burst. In the first and second embodiments of FIGS. 3 and 4, respectively, correlation can be performed if desired based upon an error signal derived from only a single channel. While this provides acceptable operation, for completely self-sufficient baseband equalization, the main weighting elements of the control algorithm for both channels must accept the errors from both channels as is well known. In the third embodiment of FIG. 5, however, the error signals from each channel are combined to eliminate the need for a conventional cross correlation, thus significantly simplifying the necessary hardware. In addition, the third embodiment advantageously correlates the error signal with unequalized data.

While several embodiments of the invention have been described above by way of example, it should be appreciated that various changes and modifications could be made to the disclosed embodiments without departing from the spirit and scope of the invention as defined in the appended claims.

We claim:
1. An adaptive equalizer, comprising:
an equalization portion for receiving an unequalized input signal modulated with data and equalizing said modulated signal in accordance with equalizer coefficient values to obtain an equalized signal;

first demodulating means for demodulating said equalized signal to obtain equalized data;

second demodulating means for demodulating said unequalized input signal to obtain unequalized data;

error signal generating means for generating an error signal in accordance with said equalized data; and coefficient generating means for generating said coefficient values in accordance with said error signal and said unequalized data.

2. An adaptive equalizer as defined in claim 1, wherein said coefficient generating means correlates said error signal with said unequalized data.

3. An adaptive equalizer as defined in any one of claims 1 or 2, wherein said coefficient generating means comprises a coefficient memory for storing generated coefficient values, and coefficient control means for providing said coefficient values to said equalizer.

4. An adaptive equalizer as defined in claim 3, wherein said input modulated signal comprises at least first and second intermittent and interleaved signals, said coefficient generating means generating a first set of coefficient values for said first intermittent signal and a second set of coefficient values for said second intermittent signal, each of said first and second sets of coefficient values being stored in said coefficient memory and provided to said equalizer portion during a subsequent corresponding first or second intermittent signal.

5. An adaptive equalizer as defined in claim 4, wherein said first set of coefficient values are calculated by said generating means while said second intermittent signal is being received by said equalization portion, and said second set of coefficient values are calculated by said generating means while said first intermittent signal is being received by said equalization portion.

6. An adaptive equalizer as defined in claim 2, wherein said generating means comprises sampling means for sampling and holding said equalized data;

analog-to-digital conversion means for converting the output of said sampling means to digital form;

buffer storage means for storing the output of said analog-to-digital conversion means;

coefficient memory means; and control means for calculating said coefficient values in accordance with the contents of said buffer storage means and storing said calculated coefficient values in said coefficient memory means, said control means, during said calculating, providing previously calculated coefficient values from said coefficient memory means to said equalization portion.

7. An adaptive equalizer as defined in claim 2, wherein said equalization portion includes delay means for delaying said modulated input signal and at least first and second equalization multipliers for multiplying the delayed and undelayed input modulated signal by respective coefficient values, said coefficient generating means comprising at least first and second correlation multipliers each receiving said error signal as one input, correlation delay means for delaying said equalized data, said undelayed equalized data being provided as an input to one of said correlation multipliers and said delayed equalized data being provided as an input to the other of said correlation multipliers.

8. An adaptive equalizer as defined in claim 7, wherein said correlation multipliers provide respective first and second correlation signals, said coefficient generating means further comprising:

first sampling means for sampling said correlation signals at a symbol rate;

averaging means for averaging said sampled correlation signals;

second sampling means for sampling said averaged correlation signals at a frame rate; and calculation means for updating said coefficient values in accordance with the outputs of said second sampling means.

9. An adaptive equalizer as defined in claim 1, wherein said unequalized input signal includes data in first and second channels, said error signal generating means comprising means for generating a first error signal in accordance with equalized data from said first channel, means for generating a second error signal in accordance with equalized data from said second channel, and means for combining said first and second error signals to generate a composite error signal, said coefficient values being generated in accordance with at least said composite error signal.

10. An adaptive equalizer as defined in claim 9, wherein said coefficient generating means further comprises error sampling means for sampling said composite error signal at a symbol rate, data sampling means for sampling said unequalized data at said symbol rate, a plurality of correlation multipliers each receiving the same output of said error sampling means as one input and each receiving as its other input a different sample from said data sampling means, averaging means for averaging the outputs of said correlation multipliers, second sampling means for sampling said averaging means outputs at a frame rate, and calculation means for updating said coefficient values in accordance with the outputs of said second sampling means.

* * * * *

UNITED STATES PATENT AND TRADEMARK OFFICE
CERTIFICATE OF CORRECTION

PATENT NO. : 4,475,211
DATED : October 2, 1984
INVENTOR(S) : William E. Mattis, Jr., Chester J. Wolejsza, Jr., Vasil Uzunoglu It is certified that error appears in the above-identified patent and that said Letters Patent is hereby corrected as shown below:

Column 1, line 37, "rceives" should be --receives--;

line 65, after "similar" insert --manner--.

Column 3, line 58, after "$jd_i$", insert --,--.

Column 6, line 54, "esential" should be --essential--.

Column 7, line 31, "equalized" should be --unequalized--.

Signed and Sealed this

Fourth Day of June 1985

[SEAL]

Attest:

DONALD J. QUIGG

*Attesting Officer*  *Acting Commissioner of Patents and Trademarks*